United States Patent [19]

Benigno

[11] Patent Number: 4,707,943

[45] Date of Patent: Nov. 24, 1987

[54] APPARATUS FOR ENTRAPPING AND RESTRAINING A GAME FARM BIRD

[76] Inventor: Carl Benigno, P.O. Box 72034, Roselle, Ill. 60172

[21] Appl. No.: 40,088

[22] Filed: Apr. 20, 1987

[51] Int. Cl.$^4$ ............................................. A01M 23/02
[52] U.S. Cl. ............................................. 43/61; 43/65
[58] Field of Search ................... 43/61, 62, 65, 69, 71; 119/82, 97, 151

[56]                References Cited

U.S. PATENT DOCUMENTS

| 441,677 | 12/1890 | Lovell | 43/61 |
| 501,599 | 7/1893 | Crockett et al. | 43/65 |
| 686,800 | 11/1901 | Barry | 43/65 |
| 1,374,014 | 4/1921 | Jakubowski | 43/61 |
| 1,741,429 | 12/1929 | Orgill | 43/61 |
| 3,807,362 | 4/1974 | Bowman et al. | 119/151 |

Primary Examiner—Nicholas P. Godici
Assistant Examiner—Karen Skillman
Attorney, Agent, or Firm—Douglas B. White

[57]                ABSTRACT

There is provided an apparatus for entrapping game farm birds having an enclosure with a screened closed end and a moveable gate at the open end. The gate is carried by a platform which is moveable between the open end and the closed end. When the platform is brought to the open end, the gate is tipped to the open position by contact of a protrusion from the gate with an abutment fixed to the enclosure. When the platform is moved away from the open end the gate is released and closes behind the birds. Upon reaching the closed end the protrusion from the gate contacts a second abutment to lock the gate in the closed position to restrain the birds for removal.

9 Claims, 2 Drawing Figures

APPARATUS FOR ENTRAPPING AND RESTRAINING A GAME FARM BIRD

BACKGROUND OF THE INVENTION

1. Field of the Invention

This invention relates generally to apparatus for entrapping and restraining live game farm birds such as pheasants. More particularly, this invention relates to traps for humanely gathering and handling pheasants or the like.

2. Description of the Prior Art

In the prior art the method of retrieving poultry or particularly game birds from a yard or field entailed the manual netting of the birds. While that system was designed to obtain a significant survival rate for the captured birds, this was not often enough the case. The trauma of the netting and handling proves to be too much for many birds. Moreover, when attempting to net birds within a cage, the birds strike the cage and die in their attempt to fly away. Domestic poultry seems to be much more tolerant of capture techniques and recently apparatus was described (U.S. Pat. No. 3,807,362, issued to Bowman et. al.) which provided for a scoop type of device which could be positioned on the front of a tractor for scooping the poultry into the enclosure. This scoop was designed with an enclosure member, having a bottom, sides, and rear wall, and having an open front for receiving the poultry as the scoop is moved across the ground. Once the poultry is positioned within the scope a lid is manually closed and latched. While this system may function well with domestic poultry, it is not the answer for game birds. Due to the fact that game birds scare easily and must be handled with more care, the scoop solution is no better than the common netting process.

SUMMARY OF THE INVENTION

The improvement of the preferred embodiment of the present invention generally provides an enclosure closed at one end with a screened wall, to provide an illusion of openness. The enclosure carries within it a moveable platform along its top side arranged to move from the open end to the closed end and is electromechanically or manually moved as required. A gate is pivotally mounted on this platform and is designed with a lever projecting upward therefrom. Near the open end of the enclosure there is an abutment positioned so as to be struck by the lever when the platform is moved toward the open end. Upon striking the abutment the lever causes the gate to swing open, and the apparatus is ready to receive birds. Near the closed end of the enclosure there is located another abutment positioned to be struck by the lever member when the platform is moved into position near the closed end. When the lever strikes this abutment the gate is locked in the closed position to prevent escape during retrieval from the enclosure. To enable this retrieval there is provided a the top of the enclosure near the closed end a door arranged for access to the entrapped birds.

Other objects and advantages of the invention will become apparent upon reading the following detailed description and claims, and upon reference to the drawings, a brief description of which follows.

While the invention will be described in connection with the preferred embodiment, it will be understood that I do not intend to limit the invention to that embodiment. On the contrary, I intend to cover all alternatives, modifications and equivalents as may be included within the spirit and scope of the invention as defined by the appended claims.

DESCRIPTION OF THE PREFERRED EMBODIMENT

Figure 1:
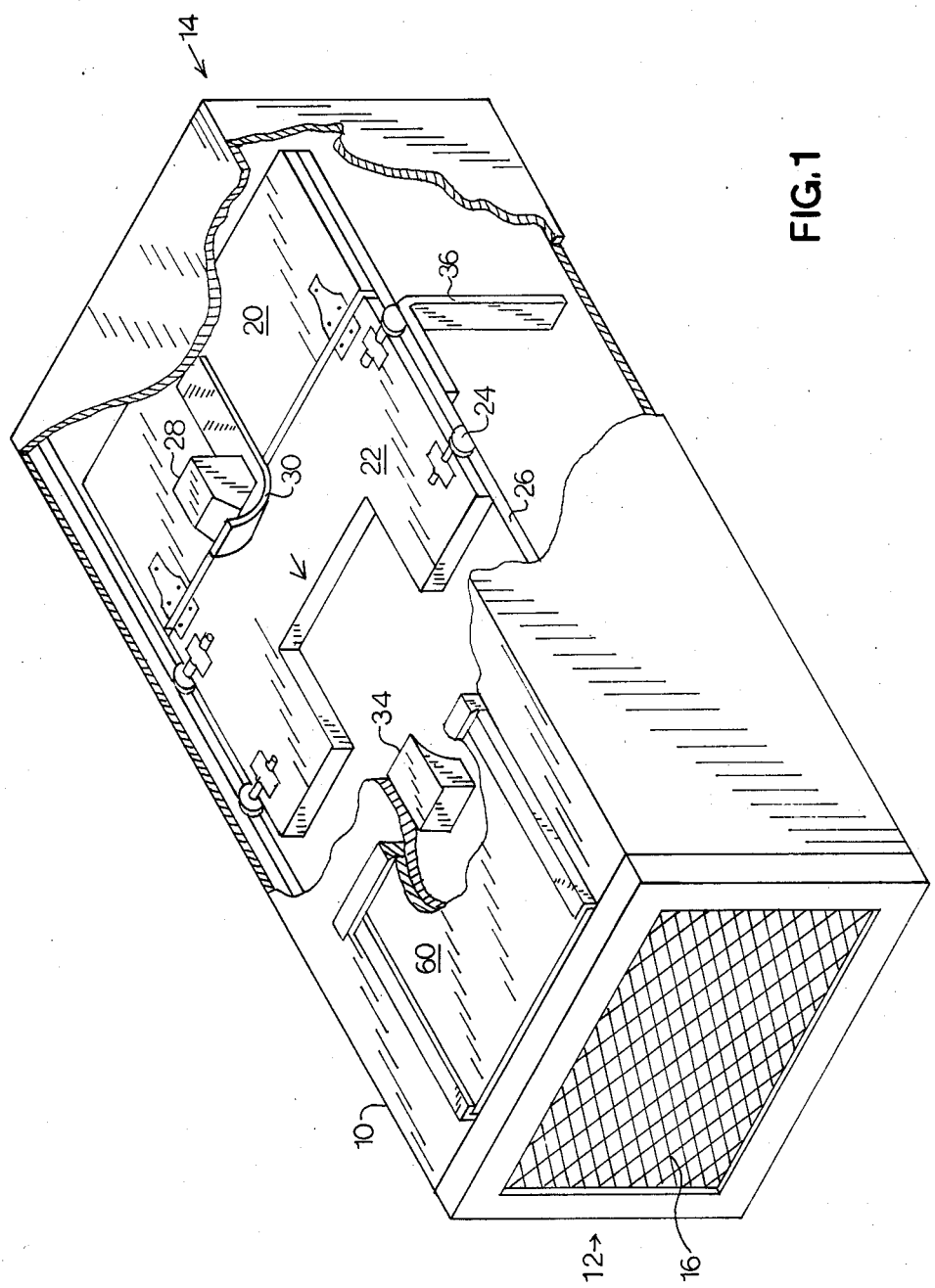
FIG. 1 is a perspective view of the preferred embodiment of the present invention, partially cut away.

Turning now to FIG. 1 there is shown a perspective view of the preferred embodiment of the present invention, partially cut away, depicting an enclosure 10 having a closed end 12 and an open end 14. Covering the closed end is a screen 16, while the open end is arranged to be selectively closed with a gate member 20 as described more fully below.

The gate member is hinged to a platform 22 which is mounted on rollers 24 and arranged to move along a track 26 affixed to the upper portion of the sides of the enclosure. When moved, the platform is shifted between a first position near the front open end of the enclosure to a second position near the rear closed end of the enclosure.

Near the open end of the enclosure there is affixed to the top of the enclosure an abutment 28. This abutment member is arranged to be struck by a protruding lever 30 affixed to the gate and protruding upward therefrom. In the preferred embodiment there is provided a forward curving portion of the lever designed to catch the abutment and rotate thereabout. The abutment in such an embodiment would be of an angular shape such that there is a rearward protruding point arranged to be struck by the lever. When this point is contacted by the lever the point becomes enveloped by the curvature of the lever as it rotates about the abutment. To allow room for the lever to operate as it pivots around the abutment there is provided an ante room 32 (FIG. 2), positioned above the abutment.

It is to be understood that the role played by the combination of the protrusion and the abutment may be accomplished by other equivalent means. For example, it is possible to accomplish this motion with a cord and pulley arrangement. A similar protrusion would not be attached directly to the gate but would be slideably positioned on the platform and arranged to strike the abutment on movement of the platform, as before. But instead of tipping the gate into the open position the protrusion would pull on a cord which would pull the gate to the open position.

A second abutment 34 is provided near the closed end of the enclosure. This abutment also is positioned at the top of the enclosure and arranged to be struck by the lever. It is contoured to mate with the curvature of the lever when in contact therewith. When the platform is moved to a position near the closed end of the enclosure, the lever strikes the abutment and locks the gate in its closed position. A stopper member 36 is positioned on one or both sides of the enclosure to provide a firm frame against which to close the gate.

Figure 2:
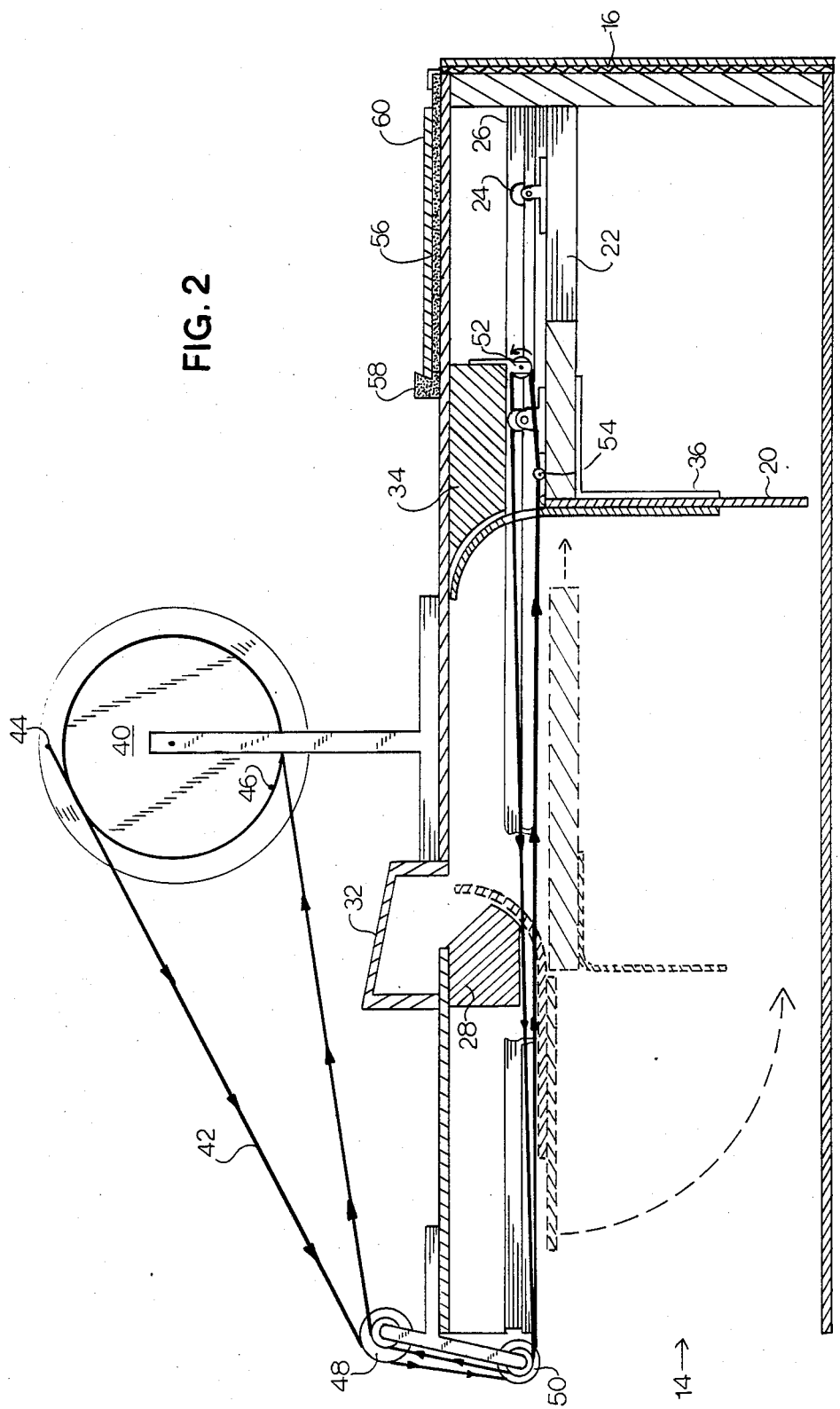
FIG. 2 is a sectional view taken longitudinally of the apparatus of the present invention.

Turning now to FIG. 2 there is shown the operational mechanism of the invention in a sectional side view.

Particularly, there is described a drive wheel 40 which may be mechanically or electrically operated. One of the primary features of this device is that it may be adequately operated by hand; that is, by using a cord or a crank to rotate the drive wheel. This device does not need to be instantaneously snapped shut to be effective as is the case with many existing animal traps. Moreover, the preferred usage would be to slowly and cautiously close the gate to avoid trauma to the birds.

Cord, rope, bike chain or steelcable 42 is used as a belt around the drive wheel. One end of the cord is affixed to the periphery 44 of the wheel and the other end is affixed to the track 46. When the wheel is rotated clockwise from the position shown, the cord portion attached to the periphery begins to wrap around the track 46 as the cord portion thereon un-wraps. From the source drive wheel, the dual cord lines are passed around dual idling pulleys 48 and 50 to bring the cord around the top edge of the open end of the enclosure. This dual line of cord is passed to and around a terminating pulley 52 at the rear of the enclosure. Attachment of the cord to the platform is provided at the forward edge 54 of the platform. In this configuration clockwise movement of the drive wheel moves the platform towards the open end, while counter-clockwise movement of the drive wheel moves the platform toward the rear.

A topsliding door 56 is provided in the top of the enclosure to provide access to birds entrapped therein. This door is provided with a handle 58 and is arranged to slide within guides 60 positioned along the sides thereof. When open the birds entrapped in the enclosure are accessible and restrained between the gate and the end of the enclosure to allow easy removal.

In operation the apparatus is placed in a yard or field of birds and they are encouraged in the direction of the apparatus by any humane non-violent means. When they come into proximity to the enclosure, they are not repelled because of the "open" illusion of the screened end. The gate is held in the open position by the action of the cord in moving the platform toward the open end of the enclosure causing the striking of the abutment by the gate lever and tipping of the gate to the open position. Once the bird enters, the gate may be lowered by the movement of the drive wheel to shift the platform away from the open end and toward the rear. By instinct the birds move toward the screen as the platform moves forward and the gate swings closed. When the gate lever strikes the abutment and clocks the gate in the closed position, the operator may open the access door to remove the bird unhurt.

I claim:

1. An apparatus for entrapping game farm birds comprising:

an enclosure having an open end and a closed end thereto;

a gate member mounted for pivotal motion on an axis arranged for lateral motion within said enclosure;

a projection member mechanically linked to said gate member to cause pivotal motion of said gate member in response to motion of said projection member;

a first abutment affixed to said enclosure proximate said open end and positioned for selective contact by said projection member; and actuating means for selectively urging said gate member toward said first abutment to cause contact between said projection member and said first abutment, whereby said gate member is caused to pivot to an open position.

2. The apparatus of claim 1 further comprising a moveable platform arranged to carry said gate member, said platform being moveable between a first position proximate said open end of said enclosure and a second position proximate said closed end, and said actuating means is arranged to selectively urge said platform toward said first position to open said enclosure, and to selectively urge said platform toward said second position to close said enclosure.

3. The apparatus of claim 2 further comprising a second abutment positioned proximate said closed end of said enclosure and arranged to contact said projection when said gate member is urged toward said second position, whereby said gate member is locked in a closed position when said projection member contacts said second abutment.

4. The apparatus of claim 3 wherein said enclosure further comprises an access door arranged for selective access to the enclosure for removal of an entrapped bird.

5. The apparatus of claim 1 wherein said actuating means comprises a drive wheel affixed to said enclosure and mechanically linked by a cord member to said platform to provide selective motion of said platform.

6. The apparatus of claim 2 wherein said actuating means comprises a drive wheel affixed to said enclosure and mechanically linked by a cord member to said platform to provide selective motion of said platform.

7. The apparatus of claim 3 wherein said actuating means comprises a drive wheel affixed to said enclosure and mechanically linked by a cord member to said platform to provide selective motion of said platform.

8. The apparatus of claim 7 wherein said projection member is rigidly attached to said gate member and has an opening defined therein, and said cord member is arranged to pass through aid opening defined in said projection member.

9. The apparatus of claim 8 further comprising stop means rigidly affixed to said platform and arranged to contact said gate member when said gate member is brought into said closed position.

* * * * *